United States Patent Office 3,397,202
Patented Aug. 13, 1968

3,397,202
11,11a - DIHYDRO - 11a - HYDROXY - 2 - (LOWER ALKYL) - 11 - R₃ - 6H - BENZO[5,6]CYCLOHEPT [1,2,3-cd]INDOLIN - 1,6 - DIONES AND INTERMEDIATES FOR THEIR PREPARATION
Janis Plostnieks, Philadelphia, Pa., assignor to McNeil Laboratories, Inc., a corporation of Pennsylvania
No Drawing. Continuation-in-part of application Ser. No. 502,473, Oct. 22, 1965. This application May 2, 1967, Ser. No. 635,403
8 Claims. (Cl. 260—247.2)

ABSTRACT OF THE DISCLOSURE

The compounds are of the class of indolin-1,6-dione derivatives useful as hypotensive agents. Also included are indolin-1,6-dione epoxides useful as intermediates.

---

This is a continuation-in-part of my copending application, Ser. No. 502,473, filed Oct. 22, 1965, now abandoned.

This invention relates to novel organic compounds, and, more particularly, to 11,11a-dihydro-11a-hydroxy-2-(lower alkyl) - 11 - R₃-6H-benzo[5,6]cyclohept[1,2,3-cd] indolin-1,6-diones, to processes for their preparation, and to new intermediate compounds involved in said processes.

The novel 11,11a-dihydro-11a-hydroxy-2-(lower alkyl) 11-R₃-6H-benzo[5,6]cyclohept[1,2,3-cd]indolin - 1,6 - diones of this invention may be represented by the following structural formula:

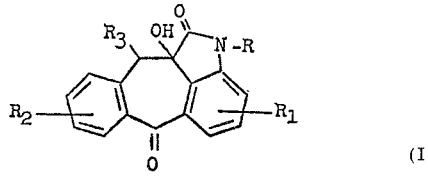

(I)

wherein R is lower alkyl; R₁ is a member selected from the group consisting of hydrogen, lower alkyl, lower alkoxy and halo; R₂ is a member selected from the group consisting of hydrogen, halo and lower alkoxy; and R₃ is substituted amino.

As used herein, lower alkyl and lower alkoxy preferably have from 1 to 5 carbon atoms, including straight or branched saturated aliphatic chains, such as, for example, methyl, ethyl, propyl, isopropyl, butyl, isobutyl, secondary-butyl, pentyl and the like, and respectively, methoxy, ethoxy, propoxy, isopropoxy, etc.; and halo includes chloro, bromo, fluoro and iodo.

The substituted amino group (R₃) in Formula (I) may be N-mono- or N,N-di-substituted amino. Typical N-mono-substituted amino groups include lower alkyl amino, e.g., methyl-amino, ethylamino, etc.; cycloalkyl amino, e.g., cyclopentyl-amino and cyclohexylamino; and aralkyl amino, e.g., benzyl-amino, phenethylamino, etc. Among the N,N-di-substituted amino groups that are operable herein are di-(lower alkyl)-amino, e.g., dimethylamino, diethylamino, methylethylamino, etc.; and, preferably a saturated heterocyclic-amino comprising a monocyclic 5- to 6-membered ring having at least one disubstituted nitrogen as the heteroatom, e.g., pyrrolidino, morpholino, piperazino, N'-alkyl-piperazino, piperidino and the like.

The subject compounds (I) may be advantageously prepared by using a 2-(lower alkyl)-6H-benzo[5,6]cyclohept [1,2,3-cd]indolin-1,6-dione of Formula (II) as the starting material. These starting materials (II), wherein R, R₁ and R₂ are as previously described, are disclosed in, and may be prepared according to the processes described in, my copending application Ser. No. 502,271.

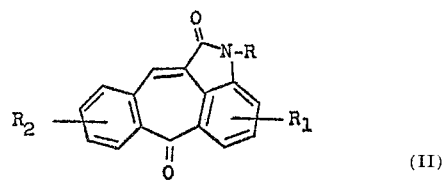

(II)

By subjecting (II) to epoxidation, for example, by treatment with alkaline hydrogen peroxide, the intermediate epoxides of Formula III are obtained. Such intermediates, which may be denoted as 2-(lower alkyl)-6H-benzo [5,6]oxireno[1,7]cyclohept[1,2,3-cd]indolin-1,6 - diones, are novel compounds and constitute an additional feature of this invention. Treatment of such epoxides with an N-mono-substituted or an N,N-di-substituted amine (R₃H) in a suitable organic solvent, such as pyridine or a lower alkanol, affords the compounds of Formula I. Elevated temperatures may be advantageously employed during the reaction. In some instances where the particular amine reactant is a liquid, it may also serve as the solvent. The foregoing reactions may be illustrated as follows:

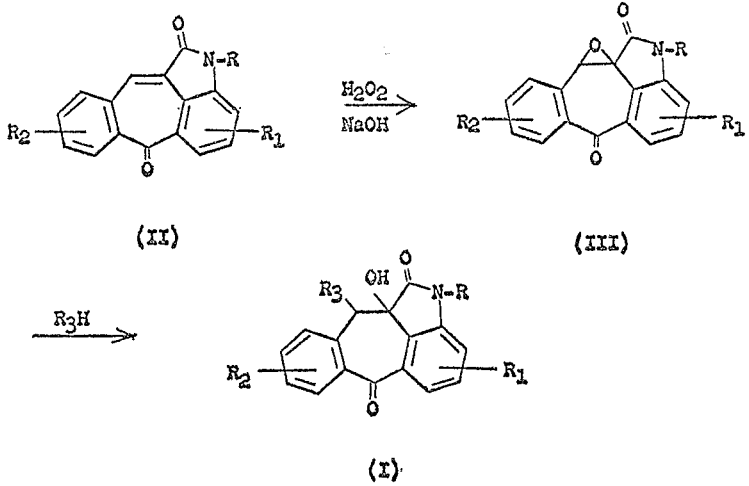

The following examples are intended to illustrate, but not to limit, the scope of the present invention.

Example I 2-methyl-6H-benzo[5,6]cyclohept[1,2,3-cd]indolin-1,6-dione (10 g., 0.038 mole) is suspended in 300 ml. of methanol. To this suspension is added 10 ml. of water, containing 3.04 g. (0.076 mole) of sodium hydroxide. To this is added 34 ml. (0.08 mole) of 30% hydrogen peroxide. The reaction mixture is stirred at room temperature for 30 min. A tan solid, 2-methyl-6H-benzo[5,6]oxireno[1,7]cyclohept[1,2,3-cd]indolin-1,6-dione, M.P. 259–261° C., is filtered off. Recrystallization from dimethylformamide raises the M.P. to 263–266° C.

Analysis.—Calculated for $C_{17}H_{11}NO_3$: C, 73.64; H, 4.00; N, 5.05%. Found: C, 73.82; H, 4.23; N, 5.35%.

Example II

The procedure of Example I is followed except that an equivalent quantity of the 2-ethyl, 2,3-dimethyl, 2-methyl-4-ethoxy, 2-methyl-5-chloro, 2-ethyl-10-methoxy, 2-ethyl-8-chloro, 2-methyl-5-chloro-10-methoxy and 2-methyl-4-ethoxy-8-chloro derivative, respectively, of 6H-benzo[5,6]cyclohept[1,2,3-cd]indolin-1,6-dione is used in place of the starting dione used therein to yield, as respective products, the corresponding 2-ethyl, 2,3-dimethyl, 2-methyl-4-ethoxy, 2-methyl-5-chloro, 2-ethyl-10-methoxy, 2-ethyl-8-chloro, 2-methyl-5-chloro-10-methoxy and 2-methyl-4-ethoxy-8-chloro derivatives of 6H-benzo[5,6]oxireno[1,7]cyclohept[1,2,3-cd]indolin-1,6-dione.

Example III 2-methyl-6H-benzo[5,6]oxireno[1,7]cyclohept[1,2,3-cd]-indolin-1,6-dione (17 g., 0.1 mole) is suspended in 80 ml. of pyridine. To this suspension are added 20 ml. of N'-methylpiperazine. The reaction is heated under reflux for ½ hr. the solvent is evaporated in vacuo. The residue is dissolved in methylene chloride and extracted with 4 N hydrochloric acid. The acid solution is made basic with ammonium hydroxide and extracted with methylene chloride. The neutral layer is dried over anhydrous magnesium sulfate and filtered. Evaporation of the solvent yields a yellow oil which is crystallized by the addition of isopropyl alcohol, giving 11,11a-dihydro-11a-hydroxy-2-methyl-11-(N'-methylpiperazino)-6H-benzo[5,6]cyclohept[1,2,3-cd]indolin-1,6-dione as a light yellow solid. The melting point, after recrystallization from isopropyl alcohol, is 229–231° C.

Analysis.—Calculated for $C_{22}H_{23}N_3O_3$: C, 70.11; H, 6.14; N, 11.13%. Found: C, 70.05; H, 6.22; N, 11.01%.

Example IV 2-methyl-6H-benzo[5,6]oxireno[1,7]cyclohept[1,2,3-cd]-indolin-1,6-dione (15 g., 0.053 mole) is suspended in 300 ml. of methanol. To this suspension are added 35 ml. of pyrrolidine. The reaction is heated under reflux for 2½ hrs. The solvent is evaporated in vacuo. The residue is suspended in methylene chloride and extracted with 4 N hydrochloric acid. The acidic solution is made basic with ammonium hydroxide and extracted with methylene chloride. The methylene chloride solvent is dried over anhydrous magnesium sulfate and evaporated in vacuo yielding a yellow oil which is crystallized by the addition of benzene-hexane giving 11,11a-dihydro-11a-hydroxy-2-methyl-11-pyrrolidinyl-6H-benzo[5,6]cyclohept[1,2,3-cd]indolin-1,6-dione; M.P. 217.5–220° C. After recrystallization from benzene-hexane, the melting point is 218–221° C.

Analysis.—Calculated for: C, 72.39; H, 5.79; N, 8.04%. Found: C, 72.60; H, 5.69; N, 8.29%.

Example V 2-methyl-6H-benzo[5,6]oxireno[1,7]cyclohept[1,2,3-cd]-indolin-1,6-dione (9.5 g., 0.034 mole) is suspended in 275 ml. of methanol. To the suspension are added 68 ml. of morpholine. The reaction mixture is heated under reflux for 3 hrs. The solution is then evaporated in vacuo. The oily residue is dissolved in chloroform and washed with 4 N hydrochloric acid. The chloroform solution is washed with sodium bicarbonate solution and dried over anhydrous magnesium sulfate, filtered, and evaporated giving a tan solid. Recrystallization and decolorization with charcoal in ethyl acetate yields 11,11a-dihydro-11a-hydroxy-2-methyl-11-morpholin-6H-benzo[5,6]cyclohept[1,2,3-cd]indolin-1,6-dione; M.P. 212–215° C. Recrystallization from ethyl acetate raises the M.P. to 214–220° C.

Analysis.—Calculated for: $C_{21}H_{20}N_2O_4$: C, 69.21; H, 5.53; N, 7.69%. Found: C, 69.34; H, 5.58; N, 7.97%.

Example VI

In accordance with the procedures outlined in Examples III and IV, and by starting with equivalent quantities of an appropriately substituted epoxy-dione, such as those obtained in Example II, and an appropriate N-mono-substituted or N,N-di-substituted amine as starting materials, there are obtained, as respective products, the 2-methyl-11-benzylamino, 2-ethyl-8-chloro-11-isopropylamino, 2-ethyl-11-(N'-methyl-piperazino), 2,3-dimethyl-11-ethylamino, 2-methyl-4-ethoxy-11-dimethylamino, 2-methyl-5-chloro-11-pyrrolidinyl, 2-ethyl-10-methoxy-11-benzylamino, 2-ethyl-8-chloro-11-(N'-methyl-piperazino), 2-methyl-5-chloro-10-methoxy-11-ethylamino, 2,3-dimethyl-11-diethylamino, 2-methyl-4-ethoxy-8-chloro-11-pyrrolidinyl, 2-ethyl-11-cyclohexylamino and 2-methyl-5-chloro-11-benzylamino derivative of 11,11a-dihydro-11a-hydroxy-6H-benzo[5,6]cyclohept[1,2,3-cd]indolin-1,6-dione.

The compounds of Formula I are useful in view of their pharmacological properties. Such compounds have hypotensive activity as exemplified by the following: when R is methyl, $R_1$ and $R_2$ are hydrogen, and $R_3$ is N'-methylpiperazino, pyrrolidino or morpholino, a lowering in blood pressure is observed in anesthetized dogs by 25–52 mm. Hg at an intraperitoneal dose of 50 mg./kg. or by more than 20 mm. Hg. at an intravenous dose of 4–16 mg./kg. The subject compounds can be administered in therapeutic dosages in conventional pharmaceutical formulations for oral and parenteral usages.

What is claimed is:

1. 11,11a-dihydro-11a-hydroxy-2-(lower alkyl)-11-$R_3$-6H-benzo[5,6]cyclohept[1,2,3-cd]indolin-1,6-dione of the formula:

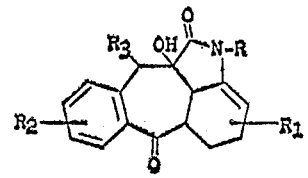

wherein R is lower alkyl; $R_1$ is a member selected from the group consisting of hydrogen, lower alkyl, lower alkoxy and halo; $R_2$ is a member selected from the group consisting of hydrogen, halo and lower alkoxy; and $R_3$ is a member selected from the group consisting of lower alkyl-amino, cycloalkyl-amino of 5 to 6 carbon atoms, benzylamino, di-lower alkyl-amino and a heterocyclic selected from the group consisting of pyrrolidino, morpholino, piperizino, N'-alkyl-piperazino and piperidino; said lower alkyl and said lower alkoxy having from 1 to 5 carbon atoms.

2. 11,11a-dihydro-11a-hydroxy-2-(lower alkyl)-11-$R_3$-6H-benzo[5,6]cyclohept[1,2,3-cd]indolin-1,6-dione according to claim 1 wherein $R_3$ is a heterocyclic as defined in claim 1.

3. 11,11a-dihydro-11a-hydroxy-2-methyl-11-(N'-methylpiperazino)-6H-benzo[5,6]cyclohept[1,2,3-cd]indolin-1,6-dione.

4. 11,11a-dihydro-11a-hydroxy-2-methyl-11-pyrrolidino-6H-benzo[5,6]cyclohept[1,2,3-cd]indolin-1,6-dione.

5. 11,11a-dihydro-11a-hydroxy - 2 - methyl - 11 - morpholino - 6H - benzo[5,6]cyclohept[1,2,3-cd]indolin-1,6-dione.

6. 2 - (lower alkyl)-6H-benzo[5,6]oxireno[1,7]cyclohept[1,2,3-cd]indolin-1,6-dione of the formula:

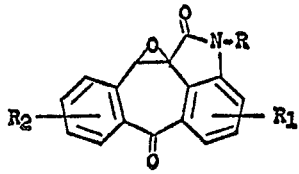

wherein R is lower alkyl; $R_1$ is a member selected from the group consisting of hydrogen, lower alkyl, lower alkoxy and halo; and $R_2$ is a member selected from the group consisting of hydrogen, halo and lower alkoxy; said lower alkyl and said lower alkoxy having from 1 to 5 carbon atoms.

7. 2-(lower alkyl)-6H-benzo[5,6]oxireno[1,7]cyclohept[1,2,3-cd]indolin-1,6-dione; said lower alkyl having from 1 to 5 carbon atoms.

8. 2 - methyl - 6H - benzo[5,6]oxireno[1,7]cyclohept[1,2,3-cd]indolin-1,6-dione.

References Cited

Expoxidation and Hydroxylation Electro Chemicals Dept., E. I. du Pont de Nemours & Co. (Inc.), Wilmington 98, Delaware, pp. 3 and 6.

NICHOLAS S. RIZZO, *Primary Examiner.*

JOSE TOVAR, *Assistant Examiner.*